United States Patent [19]

Hollyer et al.

[11] Patent Number: 5,309,565
[45] Date of Patent: May 3, 1994

[54] DSACK CLAMP

[75] Inventors: Robert Hollyer; Douglas Farrar, both of Los Altos, Calif.

[73] Assignee: Apple Computer, Inc., Cupertino, Calif.

[21] Appl. No.: 670,044

[22] Filed: Mar. 15, 1991

[51] Int. Cl.[5] .............................. G06F 15/02
[52] U.S. Cl. ........................ 395/275; 395/550
[58] Field of Search ........... 395/700, 550, 275, 725; 364/419; 209/563; 179/37

[56] References Cited

U.S. PATENT DOCUMENTS 4,308,959  1/1982  Hoover et al. ............... 209/563
4,554,411  11/1985  Armstrong ..................... 179/37

Primary Examiner—Dale M. Shaw
Assistant Examiner—Gaurav Bhatia
Attorney, Agent, or Firm—Blakely, Sokoloff, Taylor & Zafman

[57] ABSTRACT

A circuit for use in a peripheral interface unit of a microprocessor-based system that actively drives a tri-state data strobe acknowledge (DSACK*) signal to a logical low state after a delay following assertion of an address strobe by the microprocessor. The DSACK* signal is then actively driven to a logical high state in response to deassertion of the address strobe. The DSACK* signal is then returned to a high impedance state. A Schmitt trigger feedback circuit guarantees that the resulting digital "high" level in the high impedance state will exceed a defined, minimum voltage level, regardless of the circuit's capacitance load.

5 Claims, 2 Drawing Sheets

DSACK CLAMP

FIELD OF THE INVENTION

This invention relates to the field of microprocessor systems, and particularly to interface circuitry for facilitating data exchange between a central processing unit and a peripheral unit such as a memory subsystem.

BACKGROUND OF THE INVENTION

Nearly all microprocessor-based systems, especially those intended for general purpose computing, include one or more banks of random access memory for storage of programs and data. Typically, the central processing unit and the memory subsystem are interconnected by means of a multi-bit address bus and a separate multi-bit data bus. In addition, dedicated signals and interface circuitry are provided between the CPU and the memory subsystem to coordinate the exchange of data. The interface signals and the circuitry for processing them will vary depending upon the specifications of the microprocessor and the memory devices comprising the memory subsystem.

A popular microprocessor for use in general purpose computing systems is the 68030 microprocessor manufactured by Motorola. One of the signal inputs to this microprocessor for facilitating data exchange with memory subsystems and other peripheral units is a Data Strobe ACKnowledge, or DSACK* signal, which is active low. Throughout the following description, electrical signals that are active low (i.e., that are asserted by a low or near ground voltage) are denoted by appending the symbol "*". The 68030 actually has two data strobe acknowledge signals DSACK0* and DSACK1*. The clamp circuit of this invention can be used with either signal.

During data communications with peripheral units, the DSACK* signal is asserted by a peripheral unit to signify that data have been placed on the data bus. Since DSACK* outputs from many peripheral units may be associated with the CPU's DSACK* input, usually each peripheral DSACK* output consists of an open-drain pulldown driver that is normally maintained in an OFF state by the peripheral unit. All of the peripheral DSACK* outputs are connected together in a "wire-OR" configuration, and a separate resistor is used for the node's pullup.

Another DSACK* configuration has each peripheral unit actively driving its own separate DSACK* output signal. A logic OR gate then "sums" the signals to the 68030 microprocessor.

The manufacturer of the 68030 microprocessor specifies that DSACK* is asserted by driving the voltage on the input line to ground potential. The manufacturer further specifies that DSACK* must be deasserted (i.e. driven to a high state) after the deassertion of the CPU address strobe signal AS*. The maximum amount of time permitted from deassertion of AS* to deassertion of DSACK* varies with the CPU clock frequency of the 68030. However for a 40 MHz 68030 this specification is 25 nanoseconds.

If DSACK* is simply pulled high via a pullup resistor, the timing specifications of the chip manufacturer may not be met due to the delay caused by this resistor and circuit capacitance. Failure to meet the DSACK* timing specifications will adversely affect processor operation.

This problem has been addressed in the prior art by interface circuits that actively drive the DSACK* line high for a fixed period of time, after which the driver is placed in a high impedance state. However, DSACK* must not be actively maintained at a logical high state for any significant length of time since this would contribute to bus contention, noise and other problems. Prior art techniques for limiting the time that the DSACK* driver is actively in a high state include use of an open loop gate delay or a one clock period delay prior to returning to the high impedance state. These techniques cannot insure that DSACK* will be actively driven at a high state for a sufficient length of time to charge the line capacitance and still tri-state the DSACK* driver within the allowable specifications. A more desirable approach, and the one that is implemented by the present invention, is a feedback circuit for actively driving the DSACK* signal until the voltage exceeds a pre-defined "high" voltage, whereupon the driver is deactivated to a high impedance state.

SUMMARY OF THE INVENTION

The present invention provides a circuit for use in a peripheral interface unit of a microprocessor-based system that actively drives a tri-state data strobe acknowledge (DSACK*) signal to a logical low state after a delay following assertion of an address strobe by the microprocessor. The DSACK* signal is then actively driven to a logical high state in response to deassertion of the address strobe. The DSACK* signal is then returned to a high impedance state. A Schmitt trigger feedback circuit guarantees that the resulting digital "high" level in the high impedance state will exceed a defined, minimum voltage level, regardless of the circuit's capacitance load.

DETAILED DESCRIPTION OF THE INVENTION

In the following description, for purposes of explanation and not limitation, specific signals, circuit components, timing relationships, etc. are set forth in order to provide a thorough understanding of the present invention. However, it will be apparent to one skilled in the art that the present invention may be practiced in other embodiments that depart from these specific details. In other instances, detailed descriptions of well-known aspects of microprocessor systems and interface circuits are omitted so as not to obscure the description of the present invention with unnecessary detail.

Figure 1:
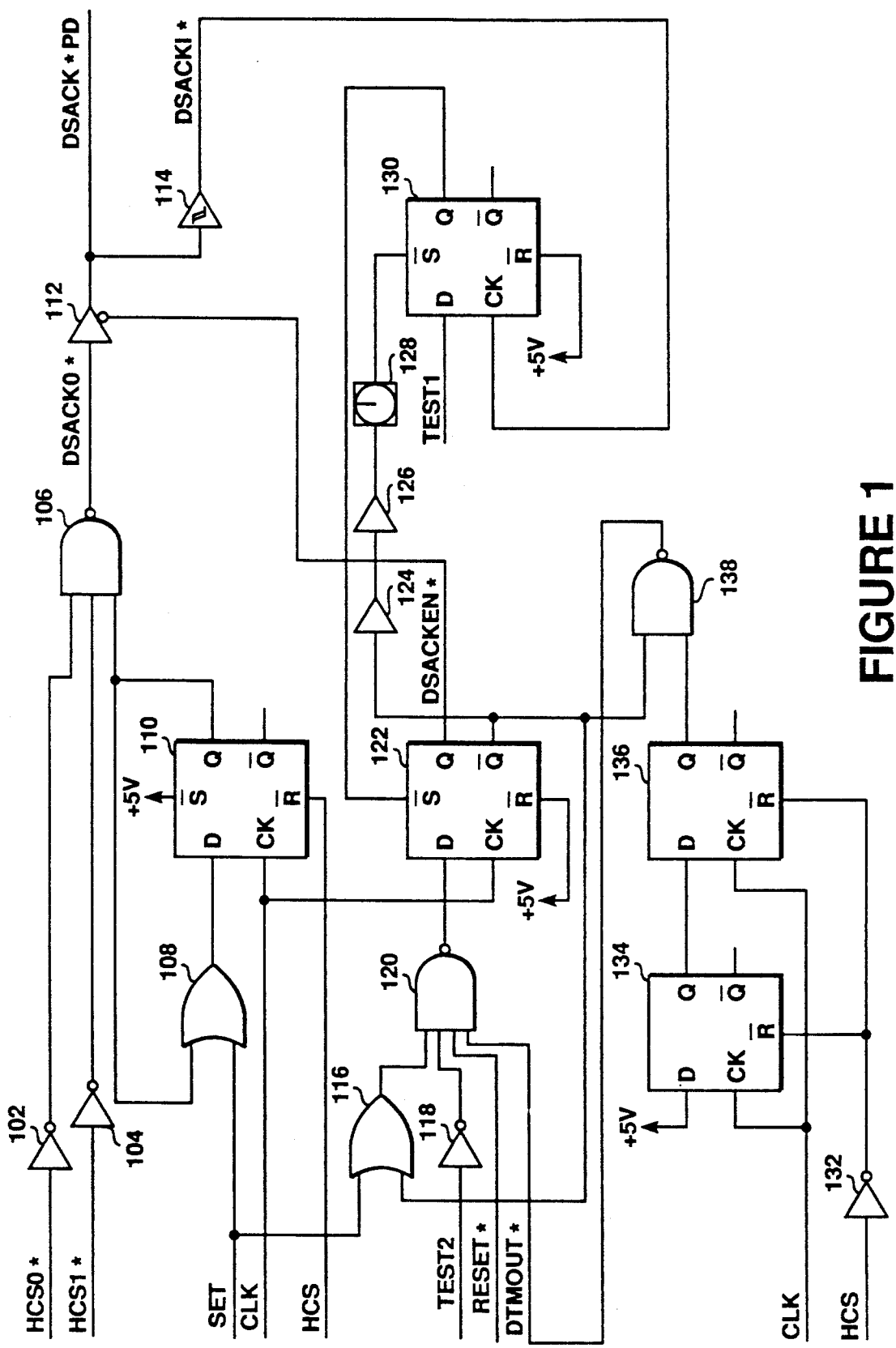
FIG. 1 is a schematic diagram of a circuit according to the present invention.

FIG. 1 presents a schematic circuit diagram of a preferred embodiment of the present invention. For purposes of this description, the following signal terminology is used:

| SIGNAL NAME | SIGNAL DESCRIPTION |
| --- | --- |
| HCS0* | Chip Select - Active low chip select developed by decoding the CPU address bus. |
| HCS1* | Address Strobe - Active low output from the CPU indicating that signals on the address bus are valid. |
| HCS | HCS0* AND HCS1* |
| CLK | I/O Clock - A clock signal asynchronous to |

-continued

| SIGNAL NAME | SIGNAL DESCRIPTION |
| --- | --- |
| | the CPU clock. In the described embodiment, signal CLK is a 15.6672 MegaHertz square wave. |
| SET | Synchronous to CLK. A one clock cycle wide positive going pulse is generated by I/O circuitry two clocks after receipt of the address strobe. |
| DSACKO* | A normally high bipolar signal driven low one clock cycle after the set signal and driven high by the address strobe. |
| DSACK*PD | The tri-state output signal applied to the DSACK* input of the CPU. |
| DSACKEN* | DSACK* enable - An active low control signal used to enable DSACK*PD. When this signal is deasserted the DSACK*PD signal is in the tri-state mode. |
| TEST 1 | A normally low, externally developed test signal for disabling the active feedback path of the circuit described herein. |
| TEST2 | A normally low, externally developed test signal for forcing all tri-state outputs on high impedance. |
| RESET* | A normally high, externally generated system reset signal. |

Referring now to FIG. 1, an exemplary circuit implementation of the present invention will be described. Signals HCS0* and HCS1*, the chip select and address strobe, are asserted at inverters 102 and 104 respectively. The outputs of these two circuits are asserted at inputs of NAND gate 106. NAND gate 106 also receives as an input the Q output of flip-flop 110. The output of NAND gate 106 is signal DSACKO*, which is applied to the input of tri-state line driver 112. The combination of inverters 102 and 104, NAND gate 106 and line driver 112 provide a high-speed path for driving signal DSACK*PD to an active high state upon deassertion of the address strobe from the CPU.

D-type flip-flop 110 receives the SET signal on its D input through OR gate 108. The Q output of flip-flop 110 is fed back to the D input through OR gate 108 so that once set, the Q output of flip-flop 110 is latched high until reset by signal HCS which is asserted at the reset input of the flip-flop.

The output of line driver 112 is asserted at Schmitt trigger 114. In the described embodiment, Schmitt trigger 114 has a 1.2 volt low going threshold and a 3.8 volt high going threshold. The output of Schmitt trigger 114, signal DSACKI*, is asserted at the clock input of D type flip-flop 130. The reset input of flip-flop 130 is disabled and the D input is normally grounded by input signal TEST1.

Signal SET is asserted at an input of OR gate 116, the output of which is asserted at an input of NAND gate 120. During normal operation, all of the remaining inputs of NAND gate 120 are at a logic high level and thus NAND gate 120 acts as an inverter for the output of OR gate 116. The output of NAND gate 120 is asserted at the D input of D-type flip-flop 122. Upon receipt of the SET signal, the Q output of flip-flop 122, signal DSACKEN*, is driven low, thereby enabling line driver 112 to actively buffer signal DSACKO*. The $\overline{Q}$ output of flip-flop 122 is applied to the delay chain comprising gates 124 and 126 and variable delay cell 128. The delay through this path is adjusted to be approximately twice the delay of the SET signal contributed by OR gate 116, NAND gate 120 and flip-flop 122. When the delayed $\overline{Q}$ output of flip-flop 122 arrives at the set input of flip-flop 130, the set condition is disabled and flip-flop 130 is prepared to respond to receipt of signal DSACKI* at its clock input. When the Q output of flip-flop 130 toggles low, flip-flop 122 is set, thereby disabling line driver 112.

The combination of inverter 132, flip-flops 134 and 136 and NAND gate 138 provides a fail-safe circuit to insure that the DSACK* signal is not driven high for more than two clock cycles following removal of the address strobe. Removal of the address strobe causes deassertion of signal HCS, which in turn allows flip-flops 134 and 136 to toggle on clock signal CLK. If two clock cycles are counted while signal DSACKEN* is low (i.e., the $\overline{Q}$ output of flip-flop 122 is high), then signal DTMOUT* will go low. This signal is fed back to NAND gate 120 and will cause the Q output of flip-flop 122 to toggle high. It will remain in this state, disabling line driver 112, until a SET signal is subsequently received.

Figure 2:
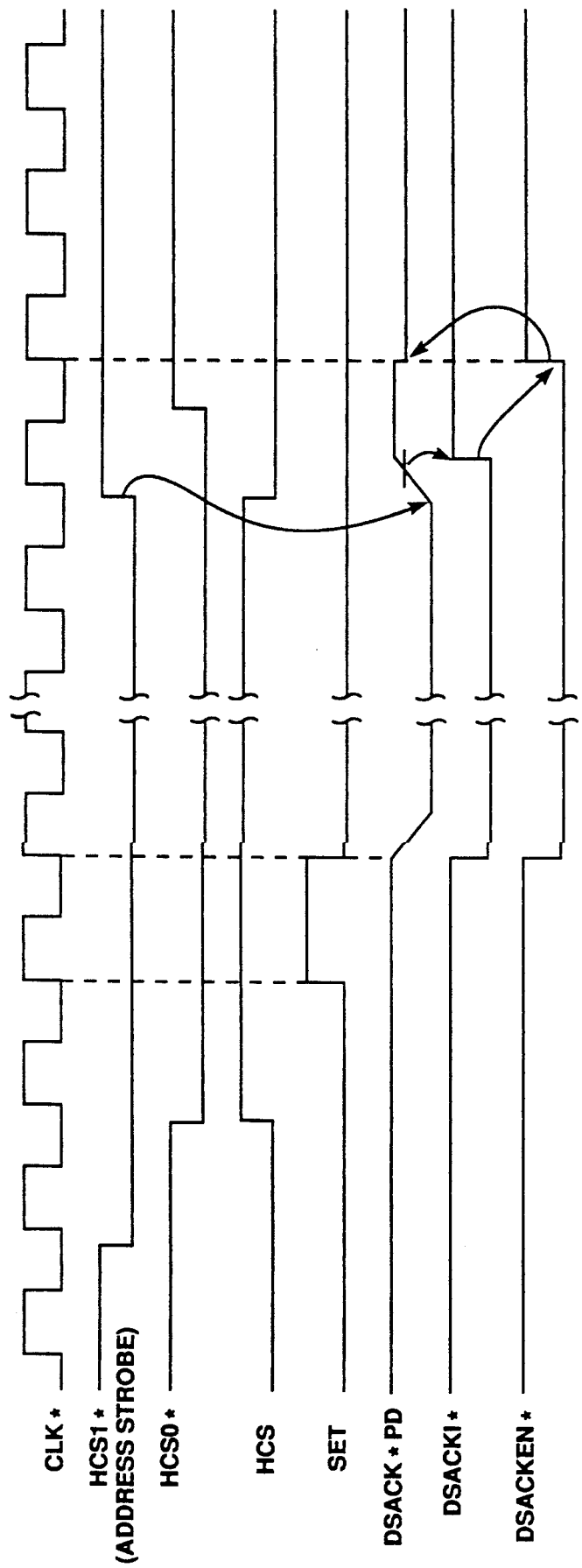
FIG. 2 is a timing diagram illustrating operation of the circuit shown in FIG. 1.

An understanding of the operation of the circuit shown in FIG. 1 will be enhanced with reference to the timing diagram shown in FIG. 2. As shown, the SET signal is received two clock cycles after the address strobe. The falling edge of the SET signal causes the Q output of flip-flop 110 to toggle high, thereby causing signal DSACKO* to go low. The CPU responds to this assertion of DSACK* by removing the address strobe (HCS1* goes high). This causes the output of NAND gate 106 to also go high, placing an active high on signal DSACK*PD and also at the input of Schmitt trigger 114. When the high-going threshold of the Schmitt trigger is crossed, signal DSACKI* is generated, thereby toggling flip-flop 130 and causing signal DSACKEN* to go high. This, in turn, causes line driver 112 to be disabled, placing output signal DSACK*PD in the tri-state mode. It can thus be seen that signal DSACK*PD is held in an active high state for as long as is necessary to cross the high-going threshold of Schmitt trigger 114. This ensures that all of the DSACK* capacitive loading is charged to the high state. The choice of Schmitt trigger threshold voltage further guarantees that the DSACK* circuit will not tri-state before the transmission line has been charged actively high. If a low value of Schmitt trigger threshold were chosen the DSACK* output might tri-state on the incident high transitioning wave or on a transmission line reflection. In this case the transmission line would not have reached a true digital "high" voltage. In addition the Schmitt trigger provides hysterisis for correct logical operation of the DSACK* timing circuit by eliminating oscillation in the threshold region.

Such operation is, however, subject to the fail-safe circuit described above that permits signal DSACK*PD to be clamped high for no more than two cycles of the I/O clock.

It will be recognized that the above described invention may be embodied in other specific forms without departing from the spirit or essential characteristics of the disclosure. Thus it is understood that the invention is not to be limited by the foregoing illustrative examples except as set forth in the appended claims.

We claim:

1. In a data processing system having a central processing unit (CPU) and at least one peripheral unit connected to the CPU by a data bus, wherein the peripheral unit provides the CPU with a tri-state data strobe acknowledgment signal when data are placed on the data bus, an apparatus for controlling generation of said tri-state data strobe acknowledgment signal comprising:

first circuit means for receiving a first address strobe signal from the CPU and for generating a bi-state data strobe acknowledgment signal in response to said first address strobe signal;

a tri-state line driver having an input coupled to said first circuit means and an output coupled to the CPU, wherein said bi-state data strobe acknowledgment signal is supplied by said first circuit means to said input of said tri-state line driver;

second circuit means for enabling said tri-state line driver in response to said first address strobe signal from the CPU;

third circuit means coupled to the output of said tri-state line driver for providing an active feedback path to said second circuit means so as to disable said tri-state line driver when the output thereof exceeds a threshold voltage.

2. The device of claim 1 further comprising fourth circuit means coupled to said second circuit means for disabling said tri-state line driver after a predetermined period of time following receipt of a second address strobe signal from the CPU.

3. The device of claim 1 wherein said third circuit means comprises a Schmitt trigger.

4. In a data processing system having a central processing unit (CPU) and at least one peripheral unit connected to the CPU by a data bus, wherein the CPU requests data from the peripheral unit and asserts an address strobe signal associated with said request, an apparatus for providing the CPU with a data strobe acknowledgment signal when the peripheral unit places the requested data on the data bus comprising:

first circuit means for receiving the address strobe signal and for causing a bi-state data strobe acknowledgment signal to transition from a first logical state to a second logical state after a first predetermined delay following assertion of the address strobe signal and for causing said bi-state data strobe acknowledgment signal to transition from said second logical state to said first logical state upon deassertion of the address strobe signal;

second circuit means for receiving said address strobe signal and for generating a driver enable signal after a second predetermined delay following receipt of the address strobe signal;

third circuit means coupled to said first and second circuit means for generating a tri-state data strobe acknowledgment signal, said tri-state data strobe acknowledgment signal having a first logic state, a second logic state, and a third logic state, wherein the first and second logic states correspond to said bi-state data strobe acknowledgment signal when said driver enable signal is asserted and wherein the tri-state data strobe acknowledgment signal is placed in the third logic state when said driver enable signal is deasserted;

fourth circuit means coupled to said second and third circuit means for sensing when said tri-state data strobe acknowledgment signal exceeds a predetermined voltage threshold and for deasserting said driver enable signal in response thereto.

5. In a data processing system having a central processing unit (CPU) and at least one peripheral unit connected to the CPU by a data bus, a method for providing the CPU with a data strobe acknowledgment signal when the peripheral unit places data requested by the CPU on the data bus comprising the steps of:

(a) receiving an address strobe signal from the CPU;

(b) generating a bi-state data strobe acknowledgment signal corresponding to said address strobe signal;

(c) providing said bi-state data strobe acknowledgment signal to a tri-state line driver so as to cause an output of said tri-state line driver to transition from a first logical state to a second logical state, said second logical state denoting that the data requested by the CPU has been placed on the data bus;

(d) sensing when the output of said tri-state line driver crosses a predetermined threshold voltage;

(e) disabling said tri-state line driver, when said output of said tri-state line driver crosses said predetermined threshold voltage, so that said output of said tri-state line driver is placed in a third logic state.

* * * * *